G. N. RENNE.
TRANSMISSION MECHANISM FOR WINDMILLS.
APPLICATION FILED AUG. 23, 1915.
1,305,933.
Patented June 3, 1919.
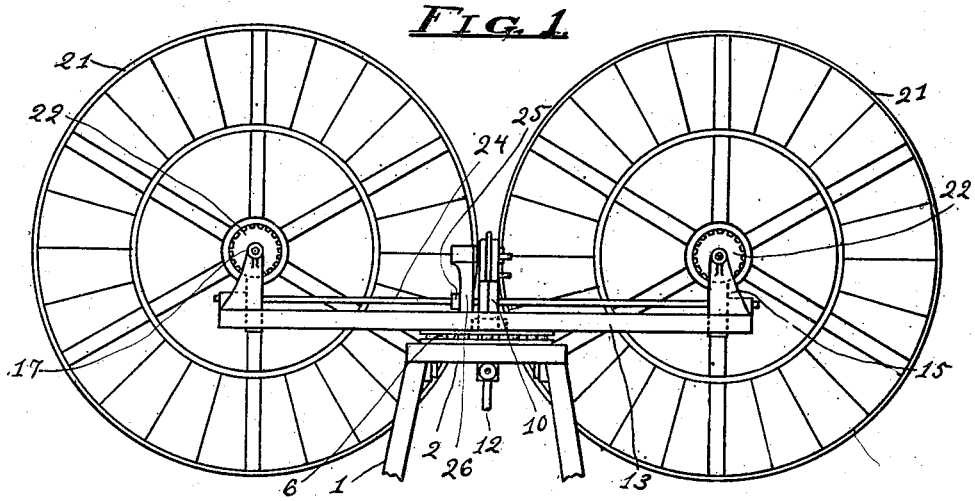
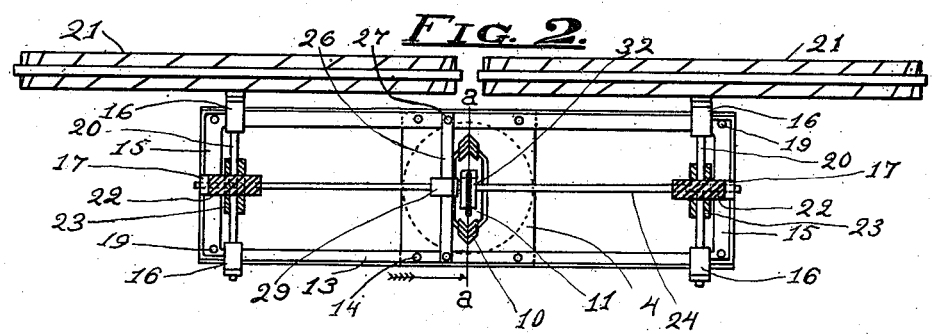
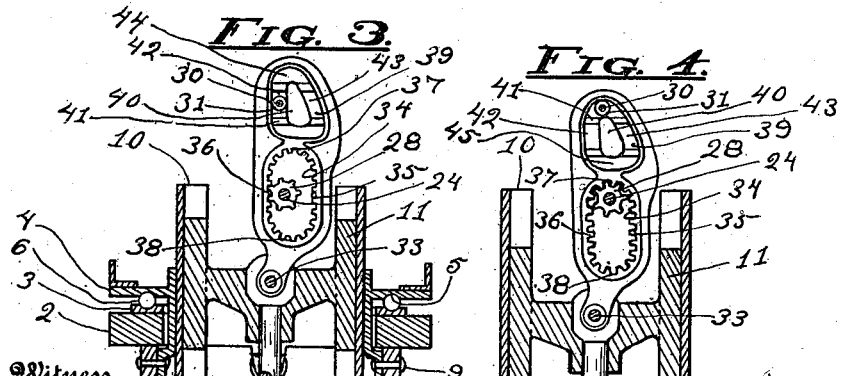
Inventor
George N. Renne,

UNITED STATES PATENT OFFICE.

GEORGE N. RENNE, OF KANSAS CITY, MISSOURI.

TRANSMISSION MECHANISM FOR WINDMILLS.

1,305,933.         Specification of Letters Patent.    Patented June 3, 1919.

Application filed August 23, 1915. Serial No. 46,784.

*To all whom it may concern:*

Be it known that I, GEORGE N. RENNE, a citizen of the United States, residing at Kansas City, in the county of Jackson and State of Missouri, have invented certain new and useful Improvements in Transmission Mechanism for Windmills, of which the following is a full, clear, and exact description, such as will enable others skilled in the art to which it appertains to make and use the same.

The invention relates to transmission mechanism for wind mills and seeks to provide a simple and efficient form of improved mechanism for reciprocatively driving the pump rod from the rotary motion of the wind wheels.

It is essential that transmission mechanism for wind mills be positive and dependable, and constructed of as few parts as possible as the mechanism is usually mounted at a considerable distance from the ground, and often allowed to run many successive days without inspection, care, or the application of oil.

The present invention seeks to provide an improved mechanism for wind mills, that will when driven by the rotary motion of the wind wheels deliver a reciprocating motion to the pump rod, and through the pump rod to the pump plunger.

It is not new to deliver a reciprocating motion from the rotary motion of the wind wheels, but by a simple arrangement and construction of mechanism the power is transmitted more directly and the friction is reduced, which increases the efficiency of the wind mill.

A further object of the invention is to arrange the mechanism so that the lifting of the pump rod and the plunger will be in a direct vertical line, thereby reducing both the wear and the resisting friction.

With these and other objects in view, the invention consists in the features of construction, shapes, combinations and arrangements of parts hereinafter set forth and more particularly pointed out in the appended claims, the mechanism being illustrated in the accompanying drawings.

In the drawings:—

Figure 1 is a view in elevation of certain parts of a wind mill to which the improved mechanism is applied.

Fig. 2 is a plan view of certain parts of a wind mill to which the mechanism is applied.

Fig. 3 is a fragmentary sectional view of the wind mill and the mechanism, taken on line *a—a* of Fig. 2.

Fig. 4 is a fragmentary sectional view of the mechanism taken on line *a—a* of Fig. 2, at another point of the stroke of the pump-rod.

The tower 1, platform 2, and ball bearing plate 3 are of usual construction and secured together in the usual manner.

The center plate 4 is provided with the ball race 5 to accommodate the usual balls 6 which support the center plate and the parts carried thereby, the arms 7 integral with the center plate projecting downward and having the rollers 8 journaled thereto by the pins 9, the rollers bearing against the lower side of the platform 2 and preventing the center plate and the parts connected thereto from lifting, by holding the center plate down upon the balls.

To the center plate 4 is secured in any usual manner the guides 10 between which is mounted to slide freely up and down, the cross head 11, the usual pump rod 12 being secured to the cross head, the rod being broken away because it is of well known usage and construction.

The angle shaped bars 13 rest upon the center plate 4 and are secured thereto by the bolts 14, the bars projecting in opposite directions from the plate and having mounted on the outer ends thereof the members 15, the latter being preferably integral with the shaft bearing boxes 16 and 17, the members being bolted to the angle shaped bars by the bolts 19.

In each pair of the boxes 16 is mounted a shaft 20 upon which is rigidly mounted the usual wind mill 21 and the spiral gear 22, the gears 22 meshing with the spiral gears 23 and the latter being rigidly mounted on the shaft 24.

The shaft 24 runs approximately parallel to the angle shaped bars 13 and is journaled in the boxes 17 and in the journal box 25, the latter being integral with the bracket 26, the bracket being secured to the center plate and the angle shaped bars by the bolts 27, the pinion 28 being rigidly mounted on the shaft adjacent the bracket.

The bracket 26 is rigid with the center plate and with the angle shaped bars 13 and is provided with the integral hub 29, in which is rigidly fitted the pin 30, the pin having journaled thereon the roller 31. From the foregoing it will be understood that while the pinion 28 and the roller 31 are rotatably mounted, they are both rigidly held in fixed position with reference to location.

The pitman 32 is pivoted to the cross head 11 by the pin 33 and is provided with the integral gear teeth 34 the pitch line of which is straight along the sides 35 and 36, and semicircular at the ends 37 and 38, the pinion 28 being at all times held in mesh with the gear teeth 34 by the roller 31, pin 30 and the bracket 26. The pitman is provided with the circuitous slotted opening 39 extending therethrough, the block 40 forming the inner walls of the slotted opening and being held in rigid position with the pitman by the ribs 41 which are preferably integral with the block and the pitman, the slotted opening being straight along the sides 42 and 43 and curved at the ends 44 and 45, the directions of the slotted opening being so constructed as to form a circuitous guide that will always hold the gear teeth 34 in mesh with the pinion 28.

In Fig. 4 the cross head and pitman are shown at the bottom of the stroke, while in Fig. 3 they are shown about one half the length of the stroke upward from the bottom thereof. It will be understood from the foregoing that during most of the upward stroke the pinion 28 is lifting the cross head 11 in alinement with the pump rod 12 and in alinement with the movement thereof, and that there will be no lateral thrust on the cross head or on the guides 10, it being well known that wind mills are usually employed to operate single acting pumps and that there is practically no stress on the working parts during the downward stroke, also that in operating double acting deep well pumps the greatest load is during the upward stroke, as the pump rod and plunger must be lifted in addition to the weight of the water, while on the downward stroke the weight of the pump rod and plunger assist in forcing the water upward.

It is obvious that changes in the details as set forth may be made without departure from the essentials of the invention.

What I claim as new and desire to secure by Letters Patent, is:—

1. In wind mill mechanism, a suitable frame, a vertically reciprocative cross-head, a plunger connecting rod depending from said cross-head, a pitman pivoted to said cross-head and projecting upward therefrom, an irregular shaped internal gear formed integral with and within said pitman, the pitch line of the teeth of said internal gear forming a semi-circle at the upward end and the lower end thereof, the pitch line of the sides of said gear positioned upright and in parallel relations, a shaft journaled in said frame and passing through said pitman, a pinion on said shaft within said pitman, a guideway in said pitman above said pinion, a roller in said guideway and journaled on a pin fixed in said frame, said roller positioned to at all times retain said pinion in mesh with said gear and cause said pitman to oscillate on the pivotal connection to said cross-head, and said roller and said pinion so positioned as to retain the pitch line of one side of said gear in alinement with said plunger connecting rod during each alternate reciprocating stroke of said pitman and cross-head and plunger connecting rod.

2. In wind mill mechanism, a suitable frame, a vertically reciprocative cross-head, a plunger connecting rod depending from said cross-head, a pitman pivoted to said cross-head and extend upward therefrom, internal gear teeth in said pitman, a shaft journaled in said frame and passing through said pitman, a pinion on said shaft within said pitman and meshing with said gear teeth, a guide above said pinion and arranged to retain said internal gear teeth in mesh with said pinion, and said pinion and said guide arranged to retain the gear teeth in one side of said pitman in alinement with said plunger connecting rod during each alternate stroke of said pitman.

In testimony whereof I affix my signature in the presence of a witness.

GEORGE N. RENNE.

Witness:
JEROME M. JOFFEE.